June 14, 1932.  G. H. TURNER  1,862,641

ROLLER BEARING

Filed Aug. 1, 1930

INVENTOR:
Gilbert H. Turner,
by Lauttaut Gravely
HIS ATTORNEYS.

Patented June 14, 1932

1,862,641

UNITED STATES PATENT OFFICE

GILBERT H. TURNER, OF CANTON, OHIO, ASSIGNOR TO THE TIMKEN ROLLER BEARING COMPANY, OF CANTON, OHIO, A CORPORATION OF OHIO

ROLLER BEARING

Application filed August 1, 1930. Serial No. 472,229.

My invention relates to roller bearings and has for its principal objects a construction in which the rollers and inner race member are permitted skewing or other movement relative to the outer race member and which is simple and easy to manufacture and to assemble. The invention consists in the roller bearing and in the parts, combinations and arrangements of parts hereinafter described and claimed.

Figure 1:
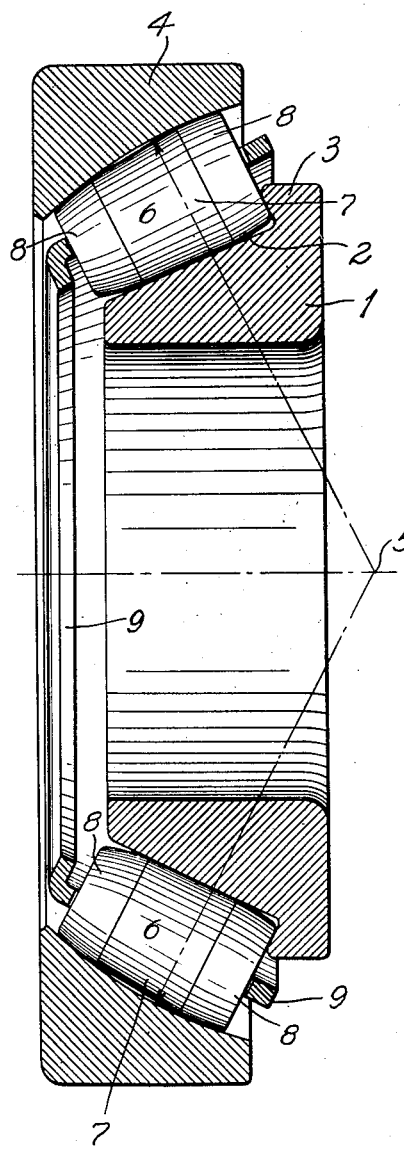
Figure 2:
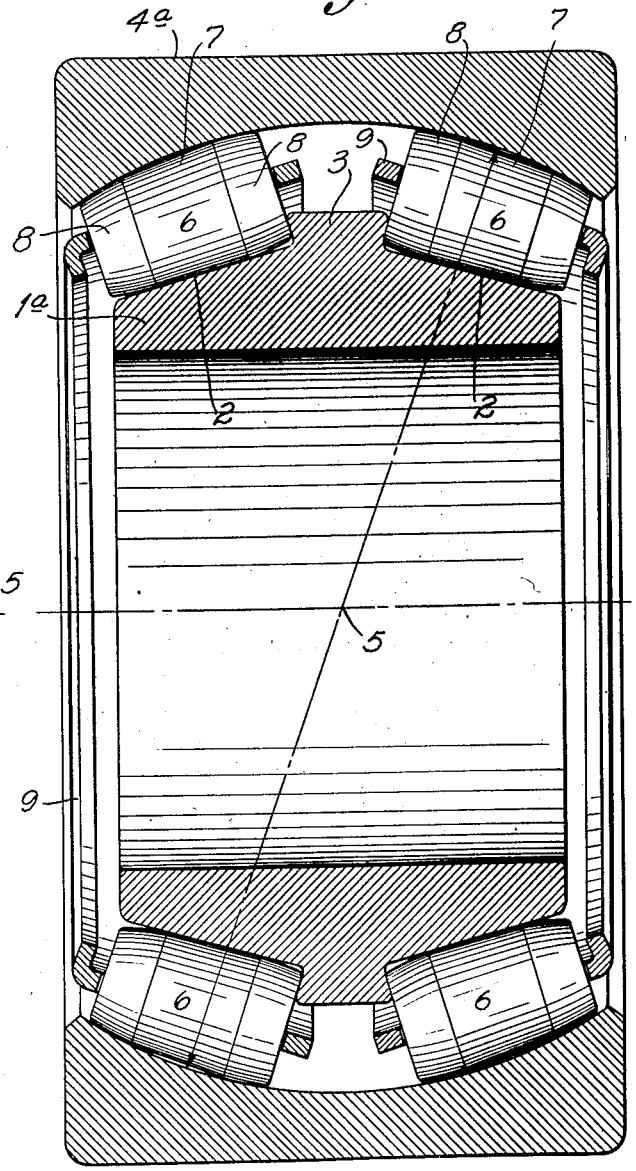

In the accompanying drawing, wherein like reference characters refer to like parts wherever they occur, Fig. 1 is a vertical longitudinal sectional view of a single row roller bearing embodying my invention; and Fig. 2 is a similar view of a double row bearing.

The single row bearing illustrated in Fig. 1 comprises a cone or inner bearing member 1 having a conical race portion 2 and provided with a thrust rib 3 at the large end of said race; a cup or outer bearing member 4 that is concavely curved endwise of the bearing about a center of curvature 5 located on the axis of the bearing and rollers 6 of generally tapering form between said bearing members. The middle or body portions 7 of said rollers are conical and make line contact with the conical race portion 2 of said cone 1. The end portions 8 of the rollers are convexly curved to fit the concave curvature of the outer bearing member 4, so that said end portions 8 of said rollers 6 make line contact with the race portion of the outer bearing member 4.

The rollers are preferably mounted in a suitable cage 9.

In the double row construction shown in Fig. 2, the cone 1ª has two conical race portions 2 with a thrust rib 3 therebetween for the large ends of the rollers. The double cup or outer bearing member 4ª is concavely curved about a center 5 located on the axis of the bearing between the two sets of rollers, about midway of the length of the bearing.

The above described bearing permits skewing or canting or like movement of the outer bearing member with respect to the inner bearing member and rollers, it provides different zones of contact on the rollers for the two bearing members, thereby distributing the wear on the rollers and assisting in the guiding of the rollers. The rollers, being of generally conical or tapering form and being disposed at an angle to the axis of the bearing, are able to take up end thrust as well as to carry radial load.

What I claim is:

1. A roller bearing comprising an inner bearing member having a conical race portion and a thrust rib at its large end, an outer bearing member concavely curved endwise and rollers of generally tapering form therebetween, said rollers having conical middle portions engaging said inner bearing member and end portions convexly curved endwise and engaging said outer bearing member.

2. A double row roller bearing including an inner bearing member having conical race portions and a thrust rib therebetween, an outer bearing member concavely curved endwise about a center located on the axis of the bearing about midway of the length of the bearing and two series of rollers of generally tapering form between said bearing members abutting against the sides of said thrust rib, said rollers having conical middle portions engaging said inner bearing member and convexly curved end portions engaging said outer bearing member.

Signed at Canton, Ohio, this 28 day of July, 1930.

GILBERT H. TURNER.